Feb. 13, 1951 C. MOTKOWICZ 2,541,533
PORTABLE OSCILLATING MEAT BLOCK RESURFACER
Filed Dec. 15, 1947 2 Sheets-Sheet 1
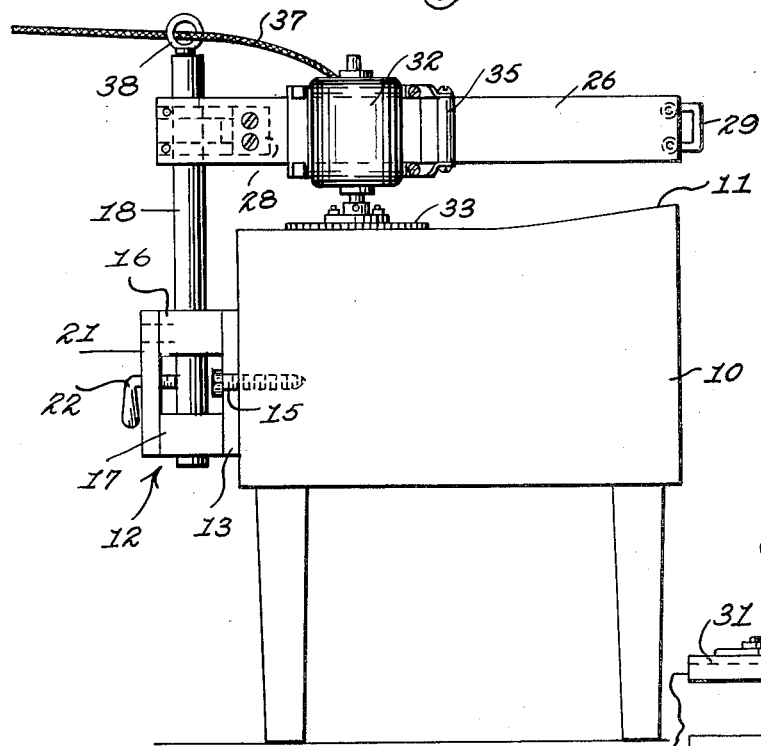
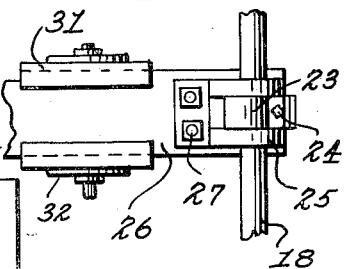
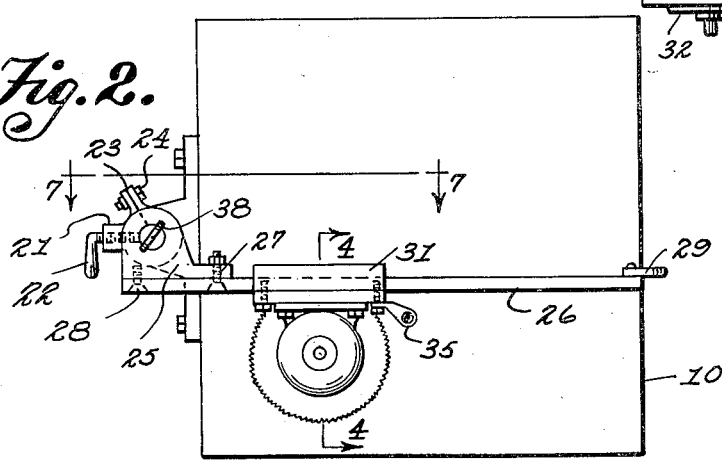
INVENTOR.
Charles Motkowicz
BY Victor J. Evans & Co.
ATTORNEYS Feb. 13, 1951 C. MOTKOWICZ 2,541,533
PORTABLE OSCILLATING MEAT BLOCK RESURFACER
Filed Dec. 15, 1947 2 Sheets-Sheet 2
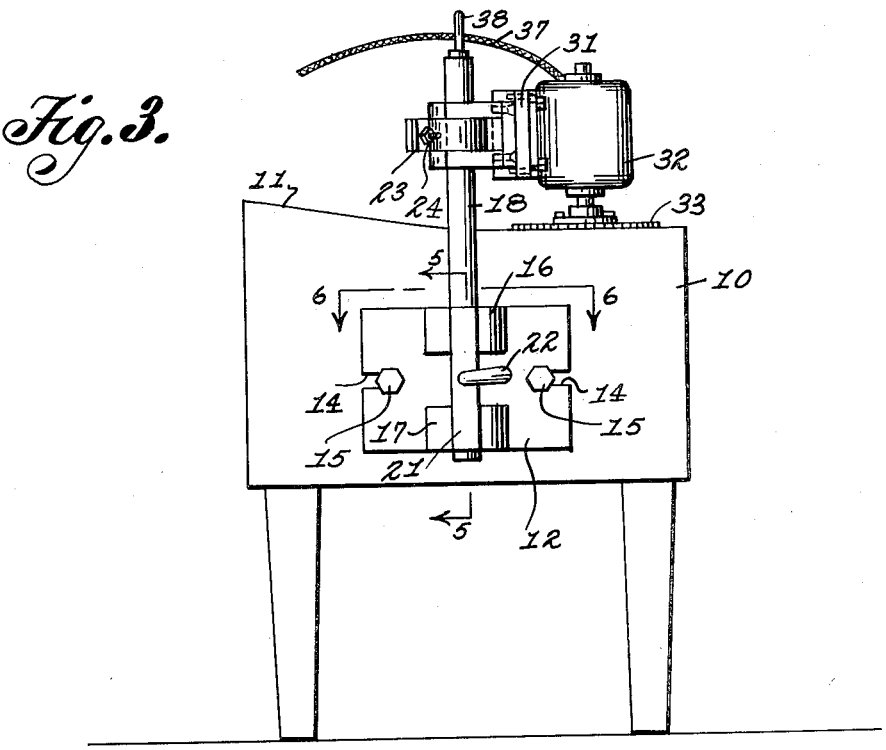
INVENTOR.
Charles Motkowicz
BY Victor J. Evans & Co.
ATTORNEYS Patented Feb. 13, 1951

2,541,533

UNITED STATES PATENT OFFICE 2,541,533

PORTABLE OSCILLATING MEAT BLOCK RESURFACER

Charles Motkowicz, Chicago, Ill.

Application December 15, 1947, Serial No. 791,791

3 Claims. (Cl. 144—2)

This invention relates to a portable oscillating meat block resurfacer.

It is an object of the present invention to provide a resurfacing tool for meat blocks which can be attached to the meat block in a simple manner and extended so as to cut from the top of the meat block the uneven surface resulting from the continued use of the meat block.

Other objects of the present invention are to provide a portable meat block resurfacer which is of simple construction, inexpensive to manufacture, easy to install on the block, easy to adjust to different levels, easy to operate and efficient in operation.

For a better understanding of the invention, reference is made to the following detailed description taken in connection with the accompanying drawing, in which Fig. 1 is a side elevational view of a meat block with the portable resurfacer embodying the features of the present invention connected thereto, and set for operation, Fig. 2 is a top plan view of the meat block and of the resurfacer, Fig. 3 is an end elevational view of the meat block and of the resurfacer connected to the end thereon.

Fig. 4 is a cross-sectional view taken through the sliding connection of the electric motor with the supporting arm and on line 4—4 of Fig. 2.

Fig. 5 is a sectional view, in elevation, taken through the clamp on the side of the block, the view being on line 5—5 of Fig. 3, Fig. 6 is a fragmentary transverse sectional view taken on line 6—6 of Fig. 3 and looking in plan upon the top of the clamp, Fig. 7 is a fragmentary elevational view looking upon the connection of the supporting arm upon the supporting post.

Referring now to the figures, 10 represents a meat block having an uneven top 11 to be resurfaced. Adapted to be placed on the end or side of the block is a clamp device 12 having an attaching plate 13 with slots 14 on the opposite sides of the same through which securing bolts or lag screws 15 are extended for securing the device 12 to the block 10. This device 12 further includes outwardly extending bearing sleeves for portions 16 and 17 vertically spaced from one another and having holes through which a vertically-extending supporting rod 18 is fitted. Between the portions 16 and 17 and at their outer ends is secured as by welding 19, a plate 21 through which a clamping screw 22 is adjustable for engagement with the rod 18 to fix it in its vertically adjusted position. On the upper end of the rod 18 there is fixed a clamp collar 23 by its securing bolt 24. A hinge member 25 is fitted on the rod 18 and has portions which extend above and below the collar 23 whereby the adjustment of the hinge member 25 on the rod 18 is limited. A guide or horizontally disposed supporting arm 26 is fixed to the member 25 by fastening bolts 27 and 28. This arm 26 has a handle 29 by means of which the arm can be swung over the top of the block 10.

On the arm 26 is a slide structure or sliding body member 31 to which is secured an electric driving motor 32 having a surfacing saw 33 adapted to cut the block and even the top thereof. The slide 31 has a handle portion or grip 35 by which it can be adjusted on the arm 26 so as to be extended from one end of the arm to the other in order that the resurfacing operation can be effected over the entire top area of the block.

The electric motor can receive current through a cord 37 which may be attached to any wall receptacle in the building where the operation is being performed. An eye 38 is secured to the upper end of the rod 18. The cord 37 is extended through the eye and is supported thereby in such a manner as to prevent the cord from interfering with the resurfacing operation or coming in contact with the saw 33.

Having now described my invention, I claim:

1. In an apparatus for resurfacing a meat block, a clamp device arranged contiguous to one side of the meat block and including a first plate detachably connected to said meat block, a pair of spaced parallel bearing sleeves projecting from said plate and secured thereto, a vertically disposed rod supported by said pair of bearing sleeves, a second plate arranged in spaced parallel relation with respect to said first plate and secured to said bearing sleeves, a clamping screw carried by said second plate and arranged in engagement with said rod for maintaining said rod immobile in its adjusted position, a collar adjustably connected to the upper end of said rod, a hinge member pivotally connected to said rod and having portions arranged on opposite sides of said collar, a horizontally disposed arm having one end secured to said hinge member, a body member slidably arranged on said arm, a motor carried by said body member, and a saw operatively connected to said motor for engagement with the meat block.

2. The apparatus as described in claim 1, and further including a handle secured to the other end of said arm for manually swinging the latter about said rod, and a grip secured to said body member for moving the latter along said arm.

3. The apparatus as described in claim 1, and further including an eye secured to the upper end of said rod, and a cord extending through said eye for connecting said motor to a source of electrical energy.

CHARLES MOTKOWICZ.

REFERENCES CITED

The following references are of record in the file of this patent:

UNITED STATES PATENTS

| Number | Name | Date |
|---|---|---|
| 1,040,419 | Rightmire | Oct. 8, 1912 |
| 1,321,931 | McGranahan et al. | Nov. 18, 1919 |
| 1,528,535 | DeWalt | Mar. 3, 1925 |
| 1,528,536 | DeWalt | Mar. 3, 1925 |
| 1,559,926 | Adair | Nov. 3, 1925 |
| 1,756,121 | Hedgpeth | Apr. 29, 1930 |
| 1,836,457 | Emmons | Dec. 15, 1931 |
| 2,022,288 | Knapp | Nov. 26, 1935 |
| 2,347,374 | Stahler | Apr. 25, 1944 |
| 2,454,992 | Coleman | Nov. 30, 1948 |